US005759604A

United States Patent [19]

Bottlinger et al.

[11] Patent Number: 5,759,604

[45] Date of Patent: Jun. 2, 1998

[54] MIXING OF PARTICULATE SOLIDS AND LIQUID FOR FLUID FOOD PREPARATION

[75] Inventors: Michael Bottlinger, Quakenbrueck; Gerd Kalvelage, Essen/Oldbg.; Hubert Poettker, Fuerstenau; Ludger Sprehe, Muehlen, all of Germany

[73] Assignee: Nestec S.A., Vevey, Switzerland

[21] Appl. No.: 547,567

[22] Filed: Oct. 24, 1995

[30] Foreign Application Priority Data

Oct. 26, 1994 [EP] European Pat. Off. .............. 94116870

[51] Int. Cl.[6] ........................................ A23F 5/00

[52] U.S. Cl. ........................ 426/433; 366/138; 366/304

[58] Field of Search ........................ 366/102–104, 366/138, 168.1, 171.1, 172.2, 176.1, 304–306, 314, 317; 99/287, 289 R, 302 C; 426/432, 433, 519

[56] References Cited

U.S. PATENT DOCUMENTS

| | | | |
|---|---|---|---|
| 2,009,957 | 7/1935 | Esch . | |
| 2,328,950 | 9/1943 | Brant . | |
| 2,478,893 | 8/1949 | Brant | 366/317 X |
| 2,627,394 | 2/1953 | Spencer | 366/317 X |
| 2,639,901 | 5/1953 | Teale . | |
| 2,641,453 | 6/1953 | Teale | 366/317 X |
| 2,649,287 | 8/1953 | McChesney | 366/171.1 |
| 3,231,242 | 1/1966 | Schrier | 366/304 |
| 3,998,433 | 12/1976 | Iwako | 366/304 X |
| 4,175,873 | 11/1979 | Iwako et al. | 366/304 X |
| 4,194,843 | 3/1980 | Martin | 366/176.1 X |
| 4,201,487 | 5/1980 | Backhaus | 366/306 X |
| 4,439,042 | 3/1984 | Bertoglio | 366/176.1 X |
| 4,691,867 | 9/1987 | Iwako et al. | 366/317 X |

FOREIGN PATENT DOCUMENTS

| | | | |
|---|---|---|---|
| 8230048 | 11/1991 | Germany . | |
| 61-19310 | 1/1986 | Japan . | |
| 888264 | 1/1962 | United Kingdom | 366/303 |
| WO9413395 | 6/1994 | WIPO . | |

OTHER PUBLICATIONS

Derwent Information Ltd., Abstract NPI Acc. No. 84–141648/23 of Backhaus German Patent Application DE–U–82 30 048 (DE 3 239 631).

*Primary Examiner*—Charles E. Cooley
*Attorney, Agent, or Firm*—Vogt & O'Donnell LLP

[57] ABSTRACT

Fluid foods and beverages are prepared by feeding a liquid and particles for consumption in a food or beverage, wherein the particles have an average size less than 1 mm, into a chamber area having opposing sides defined by a face of one stationary disc and a face of one rotatable disc. Spikes extend from each disc face transversely into the chamber area, and the discs and spikes are configured and positioned so that the spikes are disposed in an interdigital relationship so that upon rotation of the rotatable disc, the spikes do not interfere with disc rotation. Upon feeding the particles and liquid into the chamber area, the rotatable disc is rotated for a time for mixing the particles and liquid to obtain the fluid food or beverage which is removed from the chamber area centrifugally, and the preparation process is particularly adapted for preparing individual vended servings.

27 Claims, 3 Drawing Sheets

FIG. 5.
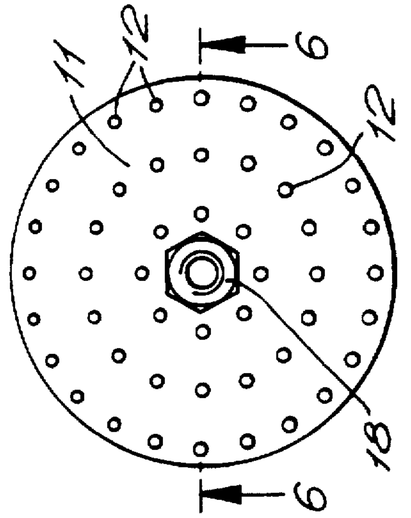
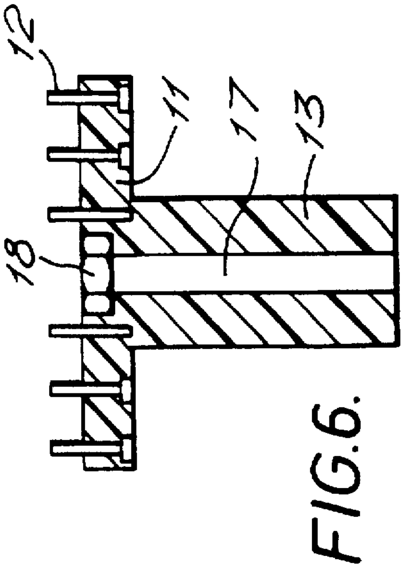
FIG. 6.
FIG. 3.
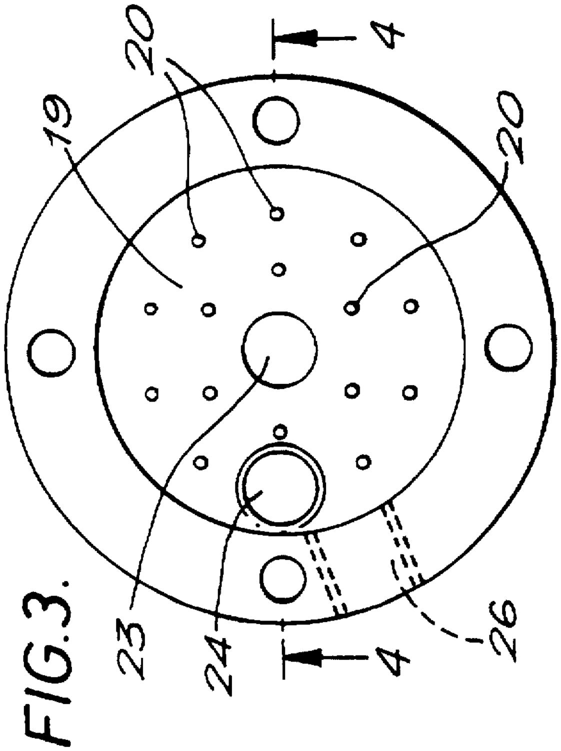
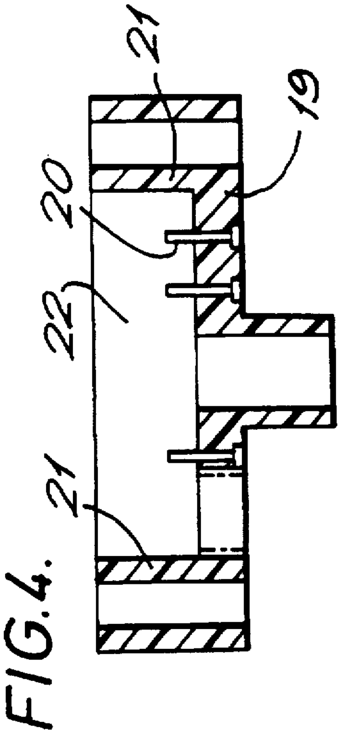
FIG. 4.

MIXING OF PARTICULATE SOLIDS AND LIQUID FOR FLUID FOOD PREPARATION

BACKGROUND OF THE INVENTION

The present invention relates to preparation of fluid foods and beverages and in particular, to mixing particulate solids and a liquid for fluid food and beverage preparation.

It is often necessary to mix pumpable foods or drinks to obtain desirable products. For instance, in the formation of Espressos reconstituted from soluble coffee solids in vending machines, it is very desirable to form a foam which is stable and abundant and which has a smooth mouthfeel. It is also often desirable to mix the ingredients of soup without forming a foam but giving a creamy texture and a smooth mouthfeel.

SUMMARY OF THE INVENTION

We have developed a process for mixing a pumpable fluid comprising finely divided solid particles and a liquid suitable for a food or drink using a device based on the principle of the pin mill in which the particle size of the solid materials to be mixed is usually less than 1 millimeter, e.g. from 50 to 800 microns. For Espresso coffee, the size of the coffee particles is usually from 200 to 500 microns.

According to the present invention, there is provided a process for mixing a pumpable fluid comprising finely divided solid particles having an average particle size of less than 1 mm and a liquid suitable for a food or drink which comprises feeding the pumpable fluid through an inlet into a mixing chamber bounded by first and second facing walls and a peripheral side wall, the first and second walls being formed by a pair of spaced discs with their opposing faces parallel, the first disc being a stationary disc and the second disc being a rotary disc adapted to rotate about its longitudinal axis, each disc being provided with spikes extending transversely from their opposing faces within the space between the discs, the spikes from the stationary disc being disposed in interdigital relationship with the spikes from the rotary disc, rotating the rotary disc to mix the pumpable fluid and removing the mixed pumpable fluid from the mixing chamber through an outlet positioned centrifugally of the inlet.

DETAILED DESCRIPTION OF THE INVENTION

The process of the present invention is particularly suitable for producing individual servings of the food or drink, for instance, Espresso coffee or soups such as would be obtained from a vending machine. In the production of individual servings, the period of rotation of the rotary disc to mix the pumpable fluid is extremely short and may be selected according to requirements, for example from 0.5 to 20 seconds and may be from 1 to 15 seconds, conveniently from 2 to 10 seconds and more conveniently from 3 to 6 seconds. The speed of rotation of the rotary disc may vary according to requirements. For example, for mixing a foamed coffee such as Espresso in a coffee vending machine, the speed of rotation may be from 8,000 to 20,000 rpm and preferably from 10,000 to 15,000 rpm. For mixing soups, the speed of rotation is generally lower, e.g. from 2,000 to 10,000 rpm.

The dimensions of the spike and the discs may be chosen according to requirements. For example, for mixing Espresso coffee in a coffee vending machine, the diameter of the discs may be from 2 to 10 cm and preferably from 4 to 8 cm. The length of the spikes may be from 1 to 10 mm and preferably from 2 to 5 mm. The width of the spikes may be from 0.1 to 5 mm and preferably from 0.5 to 3 mm. The mixing chamber may be oriented in any direction in space, e.g. the discs may be positioned with their axes vertically or horizontally or at any angle.

The discs preferably have a circular shape. They may suitably be made of a plastics material such as polyethylene, polypropylene or a food acceptable metal. The spikes may conveniently be made of a hard plastics material such as polyethylene or polypropylene.

The peripheral side wall, which is preferably circular cross-section, may be formed by means of flanges supporting the discs which may be fixed to each other to form the mixing chamber bounded by the opposing faces of the spaced apart discs.

The pumpable fluid conveniently flows into the mixing chamber through one or more apertures in the stationary disc, to which one or more inlet conduits such as pipes may be fitted. The pumpable fluid is preferably fed into the mixing chamber by gravity. The outlet means for the pumpable fluid out of the mixing chamber may be, for example, an aperture in the stationary disc positioned centrifugally of the inlet conduit or it may be an aperture through the peripheral side wall of the mixing chamber laterally of the circumference of the discs and to which an outlet conduit such as a pipe may be fitted. When the discs are supported by flanges, the outlet means may be an aperture through the periphery of the flanges fixed together.

In the production of foamed products, a separate means may be provided for the intake of air, e.g. an aperture in the stationary disc through which ambient air is sucked in by reason of the high speed of rotation of the rotary disc. However, air may be mixed with the other ingredients of the pumpable fluid before it is fed to the mixing chamber and thus enters the mixing chamber through the same inlet as, and in admixture with, the other ingredients of the pumpable fluid. The volume of air in the pumpable fluid is preferably at least the same as the volume of the liquid in the pumpable fluid, especially for an Espresso coffee.

The mixing chamber may be made of plastics material which may be quickly and cheaply manufactured by injection moulding. If desired, cleaning of the mixing chamber may be carried out by connecting a water container to an inlet conduit fitted to an aperture of the stationary disc, connecting an additional conduit to the outlet conduit fitted to the aperture through the periphery of the mixing chamber, connecting the additional conduit to a container and rotating the mixer, whereupon water is pumped from the water container through the mixer by its own pumping effect.

The additional conduit, which may be a flexible tube, is preferably provided with a valve which is normally closed and which, when opened, enables the water to be pumped through the mixer. This simple method of cleaning requiring no dismantling of the mixing chamber is extremely useful especially when the mixing chamber is fitted to a vending machine.

The interdigital relationship of the spikes is important to achieve satisfactory mixing during rotation of the rotary disc and it should, of course, be understood that the disposition of the spikes of one disc should not interfere with the spikes of the other disc to prevent rotation of the rotary disc. By means of this interdigital relationship, there is at least some interpenetration of the spikes, preferably all of the spikes, of one disc with those of the other. The extent of the interpenetration of the spikes may depend on the requirements and may vary from a fraction of the length of the spikes to substantially the whole length of the spikes extending from the faces of the discs in the mixing chamber, as long as the ends of the spikes do not contact the face of the opposite disc, which would impede rotation of the rotary disc.

The spikes are usually of circular cross-section, but they may also be of square or rectangular cross-section or other suitable shape, and, if desired, various combinations of shapes may be used.

The spikes are preferably disposed around the centre of each disc as a single ring or as a plurality of concentric rings and advantageously are regularly spaced from one another in each ring. It should be understood that the ring or rings of spikes of one disc are offset radially from the ring or rings of spikes of the other disc so as not to impede rotation of the rotary disc. The number of spikes may vary according to requirements, e.g. from 5 to 100 on each disc. For mixing Espresso in a coffee vending machine, the number of spikes is conveniently from 20 to 60 and preferably from 25 to 50 on each disc, while for mixing soups, the number of spikes on each disc is preferably from 10 to 20 on each disc.

The rotation of the rotary disc may be achieved by any suitable conventional means, such as a rotary spindle connected to the face of the disc opposite to the face provided with the spikes, which is adapted to be driven by a power source such as a motor. Conveniently, the axis of the motor may serve as the rotary spindle.

Besides, Espresso coffee and soups, the process may be used to prepare Milo syrup, ice cream and milk shakes.

The present invention is further described for the preparation of Espresso coffee by way of example only with reference to the accompanying drawings.

BRIEF DESCRIPTION OF THE DRAWINGS

FIG. 3 represents an enlarged view of the stationary disc shown in FIG. 1.

FIG. 4 represents a transverse section through FIG. 3 looking along the line 4—4 to show the arrangement of the spikes.

FIG. 5 represents an enlarged view of the rotary disc shown in FIG. 1.

FIG. 6 represents a transverse section through FIG. 5 looking along the line 6—6 to show the arrangement of the spikes.

DETAILED DESCRIPTION OF THE DRAWINGS

Figure 1:
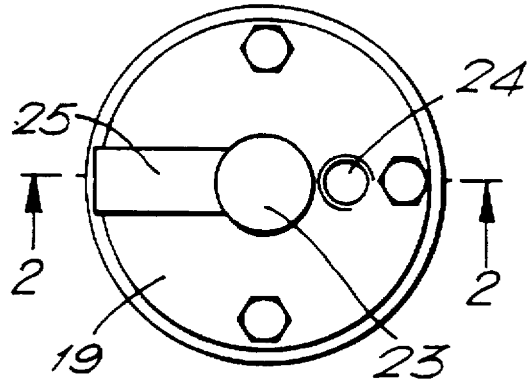
FIG. 1 represents a vertical section through a mixing device used in the present invention.
Figure 2:
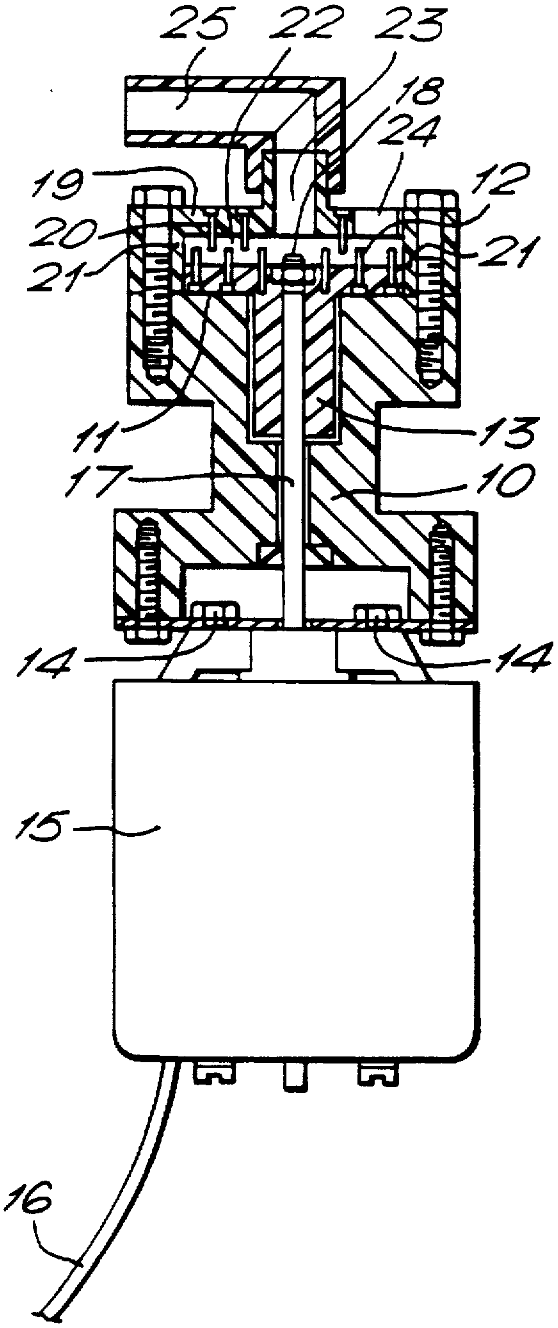
FIG. 2 represents a transverse section through FIG. 1 looking along the line 2—2.

Referring to the drawings, as illustrated in FIG. 2, a plastics housing 10 supports a circular rotary disc 11 provided with stainless steel spikes 12 arranged in three concentric rings as also illustrated in FIG. 5, and a rotary spindle 13. The base of the plastics housing 10 is bolted by means of hexagonal head screws 14 to an alternating current electric motor 15 (220 volts) with an electrical power consumption of 72 watts and a rotational speed of 12,000 rpm. The electric motor is provided with an electric cable 16 and a drive axle 17 connected to the rotary spindle 13 by means of a nut 18, as further illustrated in FIG. 6.

As illustrated in FIGS. 1–4, a circular stationary disc 19 provided with stainless steel spikes 20 arranged in two concentric rings is provided with a circular plastics flange 21 which forms a peripheral side wall which, together with the upper surface of the rotary disc, encloses a mixing chamber 22. Inlet apertures 23, 24 are provided which traverse through the stationary disc 19, and an inlet pipe 25 (FIG. 3) is fitted to the inlet aperture 23. An outlet aperture 26 is also formed which traverses the circular plastics flange 21 which forms the peripheral side wall.

Figure 7:
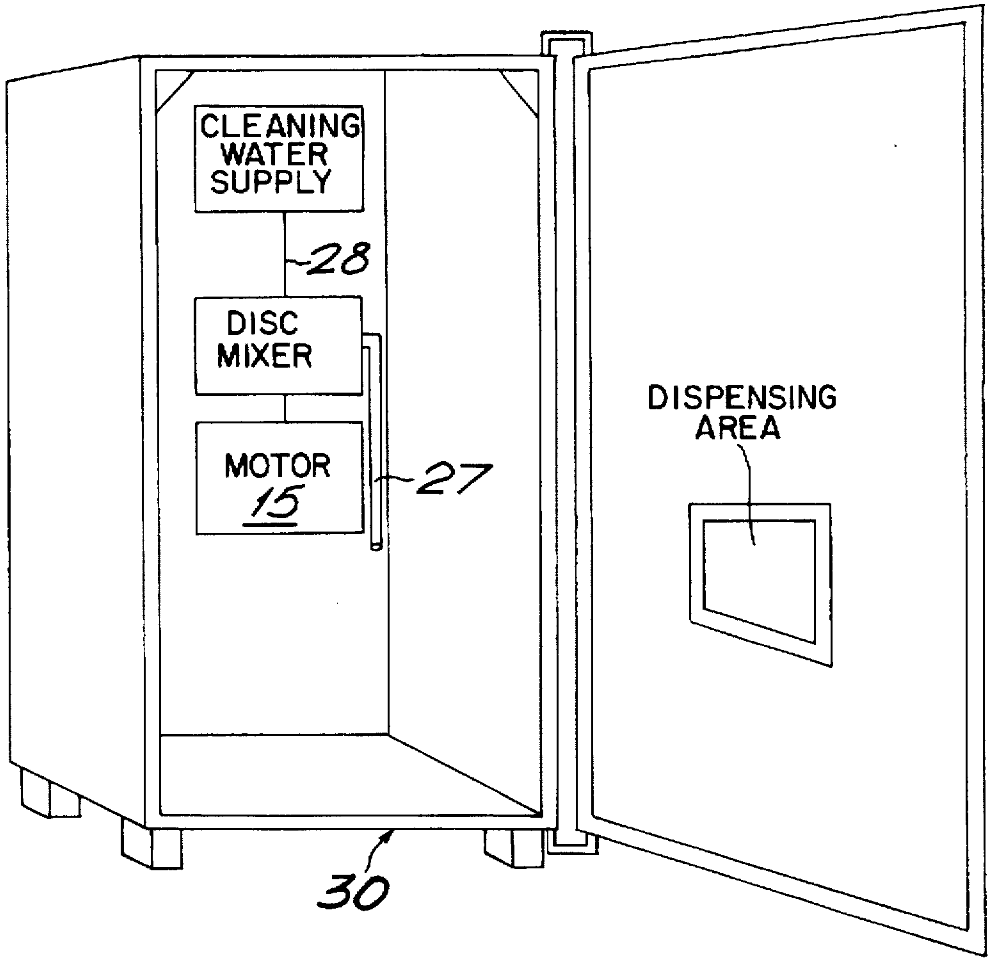
FIG. 7 represents a disc mixing device of the present invention arranged in a vending machine.

FIG. 7 represents a vending machine 30 and a mixing device of present invention. In FIG. 7, labeled boxes designate a dispensing area, a disc mixer device of the present invention, mixing device motor 15, a pipe 27 for delivering the mixed fluid product from the mixing device and a water supply connected to the mixing device by tube 27 for cleaning the device.

In operation, the mixing device is fitted to a coffee vending machine 30. When desired, the liquid coffee ingredients (particulate coffee and hot water) are fed by gravity into the mixing chamber 22 through the central aperture 23 via the inlet pipe 25 simultaneously with the start of the rotation of the rotary disc 11 at 12,000 rpm by means of the electric motor 15 (FIG. 2). The high speed of the rotation draws surrounding air through aperture 24 into the mixing chamber 22 where the liquid coffee ingredients and air are mixed for 4 seconds to produce the foamed Espresso coffee which passes by centrifugal force to the peripheral wall and is then withdrawn from the vending machine via an outlet pipe 27 (FIG. 7) fitted to the aperture 26 in the flange 21 forming the peripheral side wall (FIGS. 2 and 3).

In an alternative embodiment, the particulate coffee and hot water are mixed with the air before being fed to the mixing chamber and the aerated mixture enters the mixing chamber through aperture 23. In this embodiment, there is no outlet aperture 26 and instead, aperture 24 serves as the outlet aperture.

The Espresso coffee produced has a smooth appearance and mouthfeel and a stable and abundant foam in which the bubbles are smaller, the sizes are more similar and have a more even distribution when compared with an Espresso coffee produced by standard Espresso machines.

For cleaning the mixing device, a water container is fitted to the inlet pipe 25, and a flexible tube 28 (FIG. 7) provided with a valve which is normally closed (not shown) is fitted to the outlet pipe (not shown) fitted to the aperture 26 in the flange 21 forming the peripheral side wall. On rotating the rotary disc 11 and opening the valve, water is pumped from the water container through the mixing device by its own pumping effect.

We claim:

1. A process for preparing fluid products comprising feeding particles having an average particle size less than 1 mm and a liquid for preparing a fluid product selected from the group consisting of a coffee beverage and a soup into a chamber area, mixing the particles and liquid in the chamber area to prepare the fluid product and removing the fluid product from the chamber area centrifugally, wherein the chamber area comprises opposing sides defined by a face of one stationary disc and a face of one rotatable disc and comprises spikes which extend from the disc faces transversely into the chamber area, wherein the discs and spikes are configured and positioned so that the spikes are disposed in an interdigital relationship so that upon rotation of the rotatable disc, the spikes do not interfere with the rotatable disk rotation, and upon feeding the particles and liquid into the chamber area, rotating the rotatable disc for a time for mixing the particles and liquid to obtain the fluid product and to remove the fluid product from the chamber area centrifugally and further comprising, after removing the fluid product, pumping water into the chamber area and rotating the rotatable disc and removing the water from the chamber area centrifugally for cleaning the chamber area.

2. A process according to claim 1 wherein the particles have an average size of from 50 microns to 800 microns.

3. A process according to claim 1 wherein the fluid product is a coffee beverage and the particles have an average size of from 200 microns to 500 microns.

4. A process according to claim 1 wherein the fluid product is soup and the rotatable disc is rotated at from 2,000 rpm to 10,000 rpm for from 0.5 seconds to 20 seconds.

5. A process according to claim 4 wherein the particles have an average size of from 50 microns to 800 microns.

6. A process according to claim 4 wherein the rotatable disc is rotated for from 1 second to 15 seconds.

7. A process according to claim 4 wherein the rotatable disc is rotated for from 2 seconds to 10 seconds.

8. A process according to claim 4 wherein the rotatable disc is rotated for from 3 seconds to 6 seconds.

9. A process according to claim 1 wherein the fluid product is a coffee beverage and the rotatable disc is rotated at from 8,000 rpm to 20,000 rpm for from 0.5 seconds to 20 seconds.

10. A process according to claim 9 wherein the rotatable disc is rotated for from 2 seconds to 10 seconds.

11. A process according to claim 9 wherein the rotatable disc is rotated for from 3 seconds to 6 seconds.

12. A process according to claim 9 wherein the particles have an average size of from 50 microns to 800 microns.

13. A process according to claim 12 wherein the rotatable disc is rotated at from 10,000 rpm to 15,000 rpm.

14. A process according to claim 13 wherein the rotatable disc is rotated for from 2 seconds to 10 seconds.

15. A process according to claim 14 wherein the particles have an average size of from 200 microns to 500 microns.

16. A process according to claim 13 wherein the rotatable disc is rotated for from 3 seconds to 6 seconds.

17. A process according to claim 16 wherein the particles have an average size of from 200 microns to 500 microns.

18. A process according to claim 13 wherein the particles have an average size of from 200 microns to 500 microns.

19. A process according to claim 1 further comprising introducing air into the chamber area while rotating the rotatable disc for mixing.

20. A process according to claim 19 wherein the air is introduced into the chamber area to provide, by volume, a volume of the air at least as large as a volume of the liquid.

21. A process according to claim 1 further comprising, prior to feeding the liquid into the chamber area, mixing the liquid with air.

22. In a process for vending a fluid product from a vending machine wherein a particulate material and a liquid for preparing and obtaining a vended fluid product as an individual serving for consumption are combined and mixed in a mixing device fitted within the machine to prepare the fluid product and the fluid product is dispensed from the machine, the improvements comprising feeding particles having an average particle size less than 1 mm and a liquid for preparing a fluid product selected from the group consisting of a coffee beverage and a soup into a chamber area, mixing the particles and liquid in the chamber area to prepare the fluid product and removing the fluid product from the chamber area centrifugally, wherein the chamber area comprises opposing sides defined by a face of one stationary disc and a face of one rotatable disc and comprises spikes which extend from the disc faces transversely into the chamber area, wherein the discs and spikes are configured and positioned so that the spikes are disposed in an interdigital relationship so that upon rotation of the rotatable disc, the spikes do not interfere with the rotatable disk rotation, and upon feeding the particles and liquid into the chamber area, rotating the rotatable disc for a time for mixing the particles and liquid to obtain the fluid product and to remove the fluid product from the chamber area centrifugal and further comprising pumping water into the chamber area and rotating the rotatable disc and removing the water from the chamber area centrifugally for cleaning the chamber area.

23. A process according to claim 22 wherein the fluid product is soup, the particles have an average size of from 50 microns to 800 microns and the rotatable disc is rotated at from 2,000 rpm to 10,000 rpm.

24. A process according to claim 22 wherein the fluid product is a coffee beverage and the rotatable disc is rotated at from 8,000 rpm to 20,000 rpm.

25. A process according to claim 24 wherein the particles have an average size of from 50 microns to 800 microns.

26. A process according to claim 24 wherein the rotatable disc is rotated at from 10,000 rpm to 15,000 rpm for from 2 seconds to 10 seconds.

27. A process according to claim 24 wherein the particles have an average size of from 200 microns to 500 microns.

* * * * *